US012750574B2

(12) United States Patent
Park et al.

(10) Patent No.: US 12,750,574 B2
(45) Date of Patent: Sep. 29, 2026

(54) LENS MOVING APPARATUS

(71) Applicant: LG INNOTEK CO., LTD., Seoul (KR)

(72) Inventors: Sang Ok Park, Seoul (KR); Seong Min Lee, Seoul (KR); Jun Taek Lee, Seoul (KR); Byung Wook Son, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 227 days.

(21) Appl. No.: 18/582,168

(22) Filed: Feb. 20, 2024

(65) Prior Publication Data

US 2024/0196076 A1 Jun. 13, 2024

Related U.S. Application Data

(63) Continuation of application No. 17/326,966, filed on May 21, 2021, now Pat. No. 11,936,971, which is a continuation of application No. 16/540,631, filed on Aug. 14, 2019, now Pat. No. 11,044,388, which is a continuation of application No. 15/814,050, filed on (Continued)

(30) Foreign Application Priority Data

Oct. 17, 2014 (KR) ........................ 10-2014-0140846

(51) Int. Cl.

| | |
|---|---|
| ***H04N 23/55*** | (2023.01) |
| ***G02B 7/08*** | (2021.01) |
| ***H04N 23/51*** | (2023.01) |
| ***H04N 23/54*** | (2023.01) |
| ***H04N 23/57*** | (2023.01) |

(52) U.S. Cl.

CPC ............... *H04N 23/55* (2023.01); *G02B 7/08* (2013.01); *H04N 23/51* (2023.01); *H04N 23/54* (2023.01); *H04N 23/57* (2023.01)

(58) Field of Classification Search

CPC ........ H04N 23/55; H04N 23/51; H04N 23/54; H04N 23/57; G02B 7/08

USPC .......................................................... 359/824

See application file for complete search history.

(56) References Cited

U.S. PATENT DOCUMENTS

2004/0227978 A1 11/2004 Enomoto
2011/0141584 A1 6/2011 Henderson et al.

(Continued)

FOREIGN PATENT DOCUMENTS

CN 1272622 A 11/2000
CN 1290870 A 4/2001

(Continued)

OTHER PUBLICATIONS

Office Action dated Dec. 27, 2018 in Chinese Application No. 201510674290.2.

(Continued)

*Primary Examiner* — William Choi
(74) *Attorney, Agent, or Firm* — SALIWANCHIK, LLOYD & EISENSCHENK

(57) ABSTRACT

Embodiments provide a lens moving apparatus including a first magnet, a housing, a bobbin, around which a coil is wound and which moves in a first direction in the housing, an upper elastic member disposed on upper surfaces of the bobbin and the housing, a lower elastic member disposed under lower surfaces of the bobbin and the housing, and a damping member disposed between the upper or lower elastic member and the bobbin.

20 Claims, 10 Drawing Sheets

Related U.S. Application Data

Nov. 15, 2017, now Pat. No. 10,425,563, which is a continuation of application No. 14/886,601, filed on Oct. 19, 2015, now Pat. No. 9,854,144.

(56) References Cited

U.S. PATENT DOCUMENTS

| | | | |
|---|---|---|---|
| 2012/0025633 | A1 | 2/2012 | Lee et al. |
| 2012/0026611 | A1 | 2/2012 | Hu et al. |
| 2012/0120512 | A1 | 5/2012 | Wade et al. |
| 2013/0050828 | A1 | 2/2013 | Sato et al. |
| 2015/0309282 | A1 | 10/2015 | Lee et al. |

FOREIGN PATENT DOCUMENTS

| | | | |
|---|---|---|---|
| CN | 1321915 | A | 11/2001 |
| CN | 1618616 | A | 5/2005 |
| CN | 101713859 | A | 5/2010 |
| CN | 103091938 | A | 5/2013 |
| CN | 105527776 | A | 4/2016 |
| CN | 105607383 | A | 5/2016 |
| JP | 2007-121850 | A | 5/2007 |

OTHER PUBLICATIONS

Non-Final Office Action dated Nov. 3, 2016 in U.S. Appl. No. 14/886,601.
Non-Final Office Action dated Mar. 30, 2017 in U.S. Appl. No. 14/886,601.
Notice of Allowance dated Aug. 15, 2017 in U.S. Appl. No. 14/886,601.
Non-Final Office Action dated Nov. 19, 2018 in U.S. Appl. No. 15/814,050.
Notice of Allowance dated May 14, 2019 in U.S. Appl. No. 15/814,050.
Office Action dated Oct. 26, 2020 in Chinese Application No. 201911165341.3.
Office Action dated Mar. 9, 2021 in Korean Application No. 10-2014-0140846.
Office Action dated Oct. 29, 2020 in U.S. Appl. No. 16/540,631.
Notice of Allowance dated Feb. 24, 2021 in U.S. Appl. No. 16/540,631.
Notice of Allowance dated Jan. 24, 2022 in Chinese Application No. 201911165341.3.
Office Action dated Jan. 27, 2023 in U.S. Appl. No. 17/326,966.
Office Action dated Jun. 30, 2023 in U.S. Appl. No. 17/326,966.
Notice of Allowance dated Nov. 21, 2023 in U.S. Appl. No. 17/326,966.

LENS MOVING APPARATUS

CROSS-REFERENCE TO RELATED APPLICATIONS

This application is a continuation of U.S. application Ser. No. 17/326,966, filed May 21, 2021; which is a continuation of U.S. application Ser. No. 16/540,631, filed Aug. 14, 2019, now U.S. Pat. No. 11,044,388, issued Jun. 22, 2021; which is a continuation of U.S. application Ser. No. 15/814,050, filed Nov. 15, 2017, now U.S. Pat. No. 10,425,563, issued Sep. 24, 2019; which is a continuation of U.S. application Ser. No. 14/886,601, filed on Oct. 19, 2015, now U.S. Pat. No. 9,854,144, issued Dec. 26, 2017; which claims the benefit under 35 U.S.C. § 119 to Korean Patent Application No. 10-2014-0140846, filed on Oct. 17, 2014, all of which are hereby incorporated by reference in their entirety.

TECHNICAL FIELD

Embodiments relate to a lens moving apparatus, which is constructed to attenuate vibrations of a bobbin in the first direction of the optical axis so as to inhibit a phenomenon of resonance in the optical axis of the bobbin during lens driving or autofocusing.

BACKGROUND

In recent years, IT products equipped with subminiature digital cameras such as, for example, cellular phones, smartphones, tablet PCs, and notebook computers, have actively been developed.

IT products equipped with conventional subminiature digital cameras incorporate a lens moving apparatus for aligning the focal distance of a lens by adjusting the distance between the lens and an image sensor, which converts outside light into a digital image.

In order to fulfill the function of autofocusing, such conventional subminiature digital cameras are constructed to control the process of finding the point on an image sensor, at which the clearest image is formed, based on clarity of a digital image formed on the image sensor in accordance with the distance between the lens and the image sensor. When the function of autofocusing is performed, a bobbin equipped with the lens moves in the direction of the optical axis, which may cause the bobbin to vibrate in the direction of the optical axis.

When the frequency of the vibrations of the bobbin in the direction of the optical axis becomes close or equal to the natural frequency of the bobbin and the housing, there is a problem in that a phenomenon of resonance occurs between the bobbin and the housing, which are connected to each other via an elastic element.

BRIEF SUMMARY

Embodiments intend to provide a lens moving apparatus, which is designed to attenuate vibrations of a bobbin in the first direction of the optical axis so as to inhibit a phenomenon of resonance in the direction of the optical axis of the bobbin during lens driving or autofocusing.

In one embodiment, a lens moving apparatus includes a first magnet, a housing, a bobbin, around which a coil is wound and which moves in a first direction in the housing, an upper elastic member disposed on upper surfaces of the bobbin and the housing, a lower elastic member disposed under lower surfaces of the bobbin and the housing, and a damping member disposed between the upper or lower elastic member and the bobbin.

In another embodiment, a lens moving apparatus includes a first magnet, a housing, a bobbin, around which a coil is wound and which moves in a first direction in the housing, an upper elastic member disposed on upper surfaces of the bobbin and the housing, a lower elastic member disposed under lower surfaces of the bobbin and the housing, a damping member disposed between the upper or lower elastic member and the bobbin, and a displacement detection unit for detecting a displacement value of the bobbin in the first direction.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
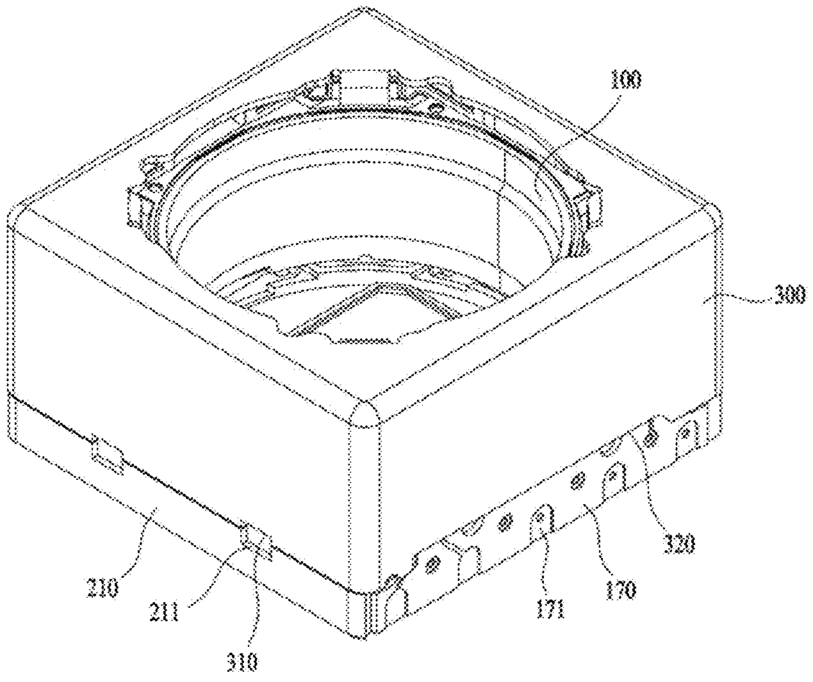
FIG. 1 is a schematic perspective view of a lens moving apparatus according to an embodiment of the present invention.

Hereinafter, embodiments will be described with reference to the attached drawings. In the drawings, the same or similar elements are denoted by the same reference numerals even when they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not always shown at the proper scale. For reference, in the respective drawings, a rectangular coordinate system (x, y, z) may be used. In the drawings, the x-axis and the y-axis mean a plane perpendicular to the optical axis and, for convenience, an optical axis (z-axis) direction may be referred to as a first direction, an x-axis direction may be referred to as a second direction, and a y-axis direction may be referred to as a third direction.

Figure 2:
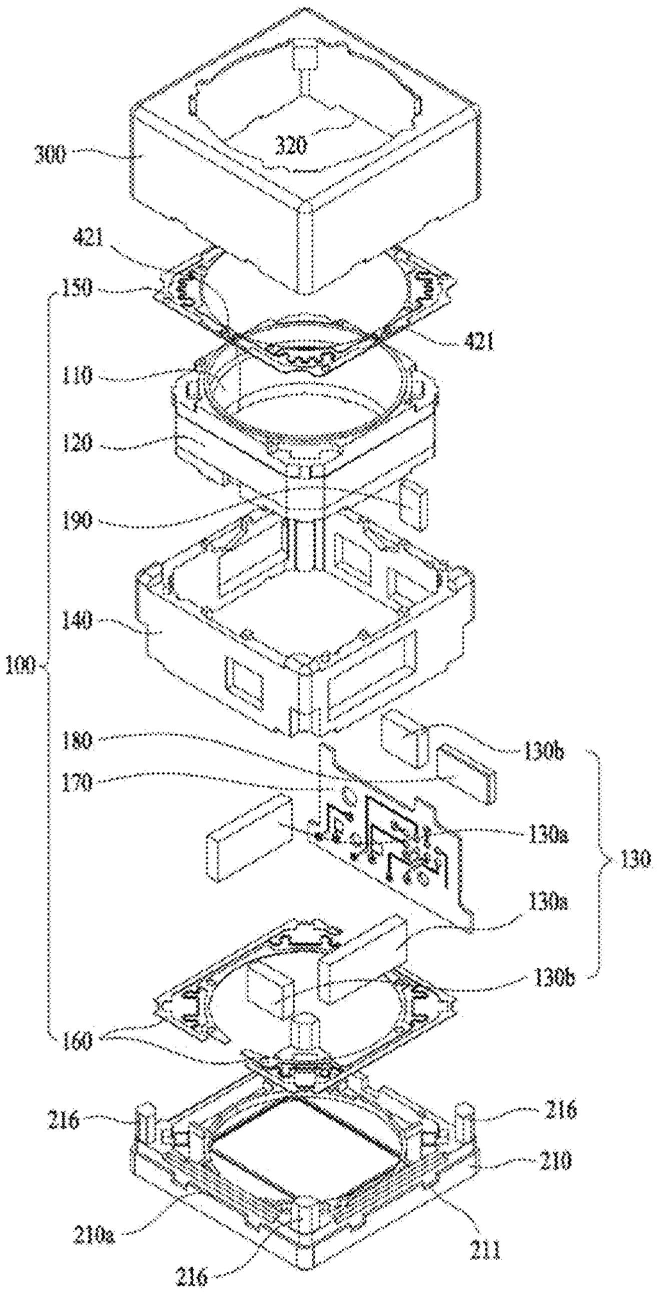
FIG. 2 is an exploded schematic perspective view of the lens moving apparatus according to the embodiment of the present invention.
Figure 3:
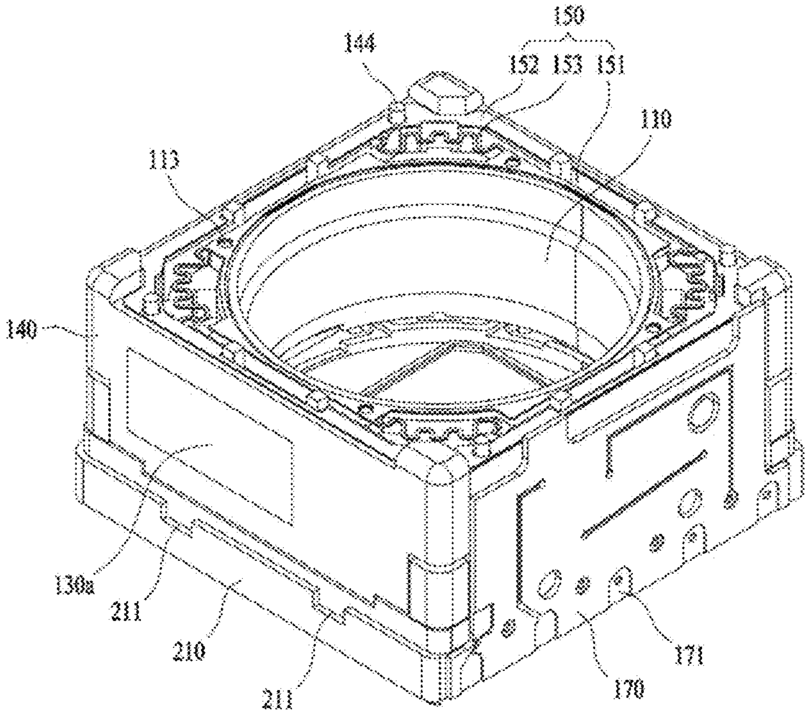
FIG. 3 is a schematic perspective view of the lens moving apparatus of FIG. 1, from which a cover member is removed.
Figure 4:
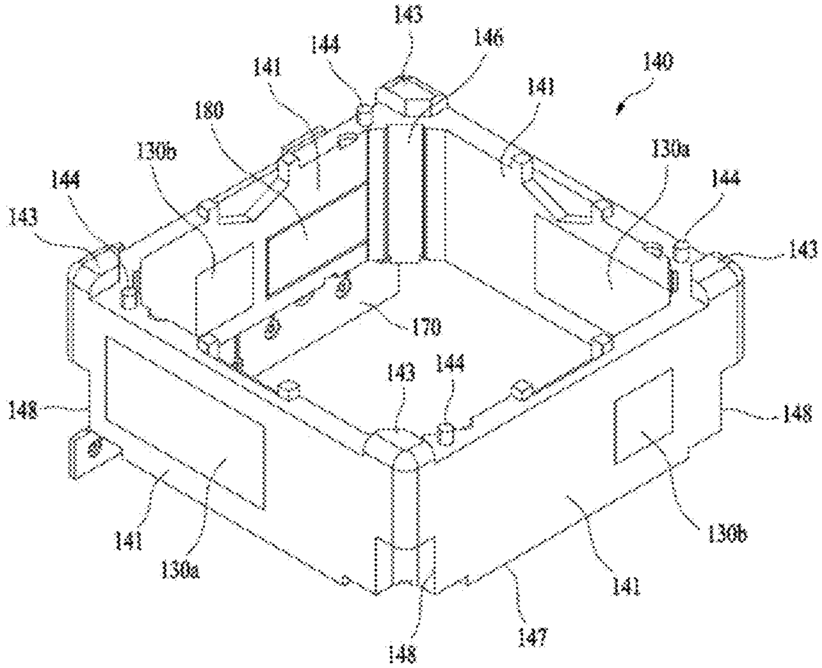
FIG. 4 is a schematic perspective view of a housing according to the embodiment of the present invention.
Figure 5:
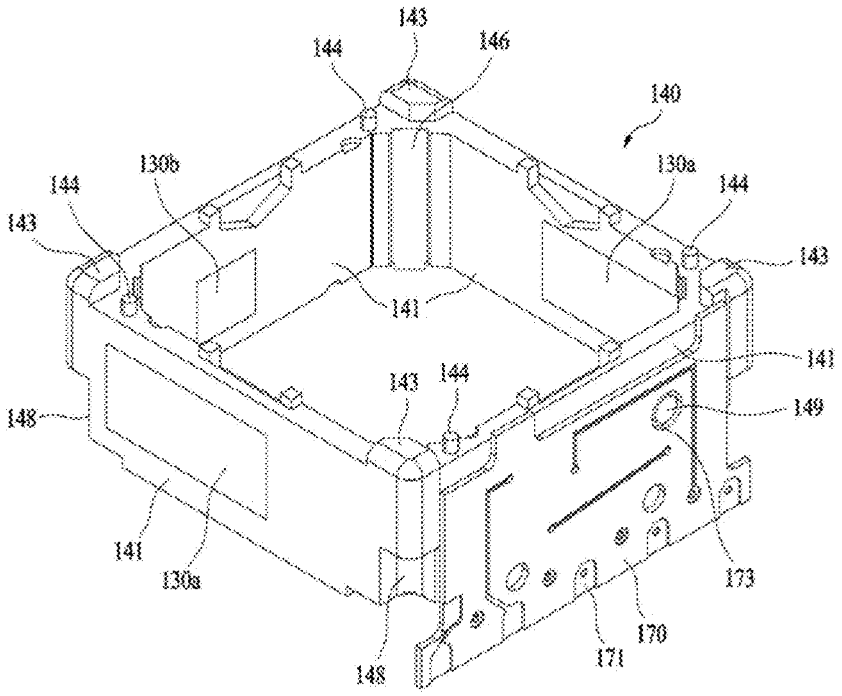
FIG. 5 is a schematic perspective view of the housing, when viewed from a different angle.
Figure 6:
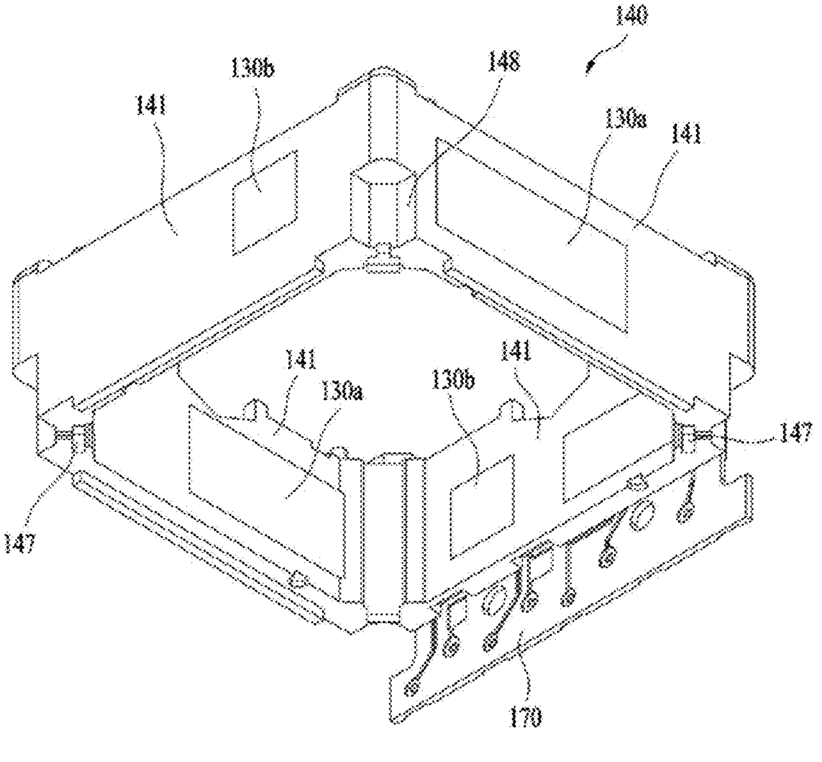
FIG. 6 is a schematic bottom perspective view of the housing according to the embodiment of the present invention.
Figure 7:
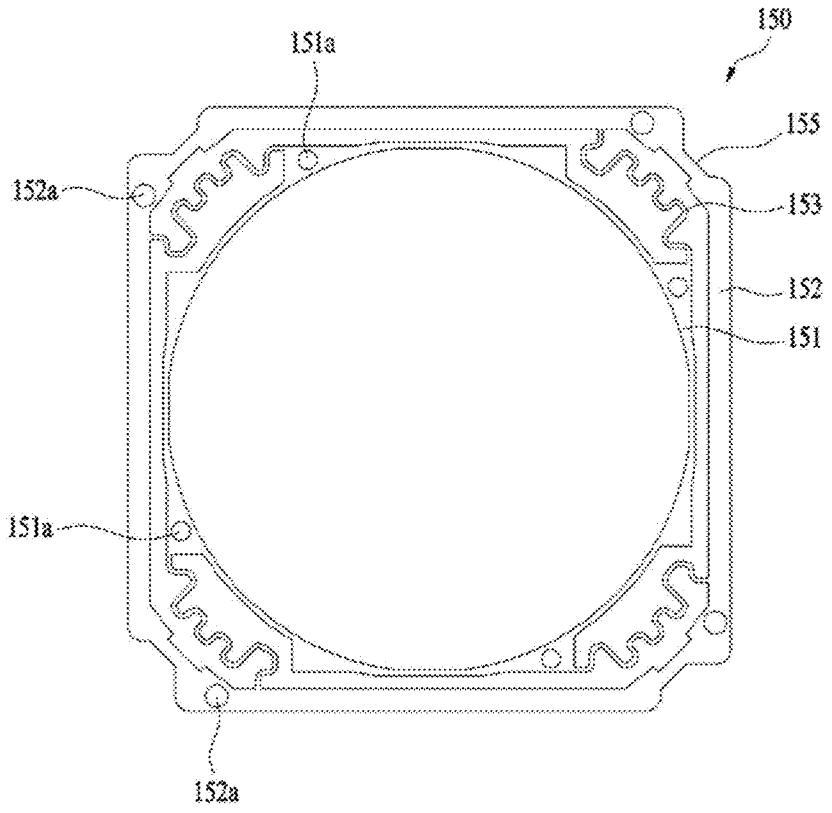
FIG. 7 is a schematic plan view of an upper elastic member according to the embodiment of the present invention.
Figure 8:
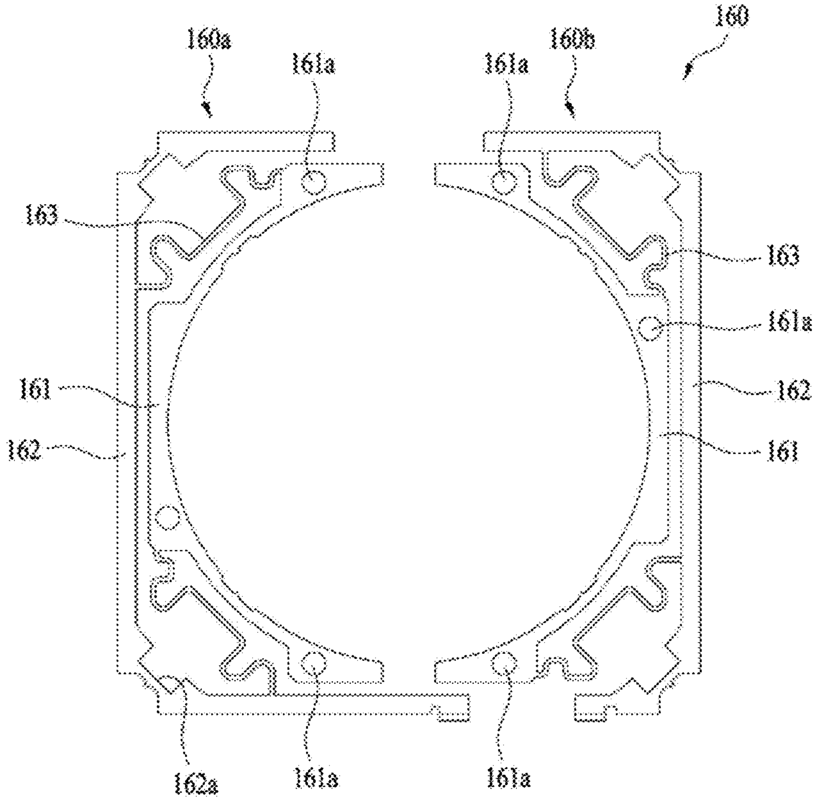
FIG. 8 is a schematic plan view of a lower elastic member according to the embodiment of the present invention.

FIG. 1 is a schematic perspective view of a lens moving apparatus 100 according to an embodiment of the present invention. FIG. 2 is an exploded schematic perspective view of the lens moving apparatus 100 according to the embodiment of the present invention. FIG. 3 is a schematic perspective view of the lens moving apparatus 100 of FIG. 1, from which a cover member 300 is removed. FIG. 4 is a schematic perspective view of a housing 140 according to the embodiment of the present invention. FIG. 5 is a schematic perspective view of the housing 140, when viewed at a different angle. FIG. 6 is a schematic bottom perspective view of the housing 140 according to the embodiment of the present invention. FIG. 7 is a schematic plan view of an upper elastic member 150 according to the embodiment of the present invention. FIG. 8 is a schematic plan view of a lower elastic member 160 according to the embodiment of the present invention.

The lens moving apparatus 100 according to this embodiment is designed to position an image sensor at the focal distance of a lens in a camera module by adjusting the distance between the lens and the image sensor. In other words, the lens moving apparatus 100 serves to fulfill the autofocusing function.

As shown in FIGS. 1 to 3, the lens moving apparatus 100 according to this embodiment may include a cover member 300, an upper elastic member 150, a bobbin 110, a coil 120 provided on the bobbin 110, a housing 140, a first magnet 130 and a printed circuit board 170 which are provided at the housing 140 for driving, a lower elastic member 160, a base 210, a displacement detection unit for determining the amount of displacement of the bobbin 110 in the optical axis direction (i.e. in the first direction), and a damping member 410 serving as an attenuator.

The cover member 300 may be configured to have a box shape as a whole, and may be coupled to the upper surface of the base 210. The cover member 300 in conjunction with the base 210 may define an accommodation space which accommodates the upper elastic member 150, the bobbin 110, the coil 120 provided around the bobbin 110, the housing 140, the first magnet 130 provided at the housing, and the printed circuit board 170.

The cover member 300 may have an opening formed in the upper surface thereof in order to allow a lens coupled to the bobbin 110 to be exposed to external light. In addition, the opening may be provided with a window made of a light-transmissive material so as to block the infiltration of dust, moisture and the like into the camera module.

The cover member 300 may include first cutout portions 310 formed in the lower end thereof. As described hereinafter, the base 210 may include second cutout portions 211 at positions at which the first cutout portions 310 are disposed (i.e. at positions corresponding to the first cutout portions 310) when the base 210 is coupled to the cover member 300. When the cover member 300 is coupled to the base 210, the combination of the first cutout portions 310 and the second cutout portions 211 may result in cutout holes each having a predetermined area. A viscous adhesive material may be applied to the cutout holes.

More specifically, the adhesive material applied to the cutout holes fills the gap defined between the mating surfaces of the cover member 300 and the base 210. Consequently, when the cover member 300 is coupled to the base 210, the gap between the cover member 300 and the base 210 may be sealed by means of the adhesive material, and thus lateral side walls of the cover member 300 and the base 210 may be sealed shut.

Furthermore, the cover member 300 may be provided with a third cutout portion 320 at an end surface thereof corresponding to the terminal surface of the printed circuit board 170 such that the end surface of the cover member 300 does not interfere with a plurality of terminals formed at the terminal surface of the printed circuit board 170. The third cutout portion 320 may be configured to be concave throughout the length of the surface thereof that faces the terminal surface of the printed circuit board 170. An adhesive material may be applied to the third cutout portion 320 to seal the gap between the cover member 300, the base 210 and the printed circuit board 170. Thanks to the adhesive material, the lateral surfaces of the cover member 300 and the base 210 may also be sealingly closed when the cover member 300 is coupled to the base 210.

Although the first cutout portions 310 and the third cutout portion 320 are illustrated as being formed both at the cover member 300 and the base 210, respectively, they may be configured to have any of similar shapes, and may be formed only at one of the cover member 300 and the base 210 without limitation.

The base 210 may be configured to have a rectangular shape, and may define the accommodation space for the bobbin 110 and the housing 140 when coupled to the cover member 300.

The base 210 may be provided at an outer and lower surface thereof with a shoulder protruding outward by a predetermined thickness. The thickness of the shoulder is the same as that of a side wall of the cover member 300. When the cover member 300 is coupled to the base 210, the side wall of the cover member 300 may be mounted on, may contact, may be disposed on or may be coupled to an upper portion or a side surface of the shoulder.

Therefore, the shoulder may guide the cover member 300 coupled to the upper end thereof, and may contact the end of the cover member 300 in a surface-contact manner. The end of the cover member may include a bottom surface or a side surface. The end of the shoulder and the end of the cover member 300 may be adhesively secured or sealed to each other by means of an adhesive or the like.

The second cutout portions 211 may be formed at the positions of the shoulder corresponding to the first cutout portions 310 of the cover member 300. As described above, the second cutout portions 211 define the cutout holes serving as adhesive spaces when being combined with the first cutout portions 310 of the cover member 300.

The base 210 may have an opening in the center thereof. The opening may be formed at a position corresponding to the image sensor provided in the camera module.

Furthermore, the base 210 may include four guide members 216 which vertically project upward from the four corners by a predetermined height. The guide members 216 may have a polygonal column shape.

The guide members 216 may be fitted in, fastened to or coupled to lower guide grooves 148 in the housing 140, which will be described later. Thanks to the guide members 216 and the lower guide grooves 148, when the housing 140 is mounted or disposed on the base 210, it is possible to guide the coupling position of the housing 140 with respect to the base 210, and it is further possible to inhibit the housing 140 from being displaced from the reference mount position due to vibrations during the operation of the lens moving apparatus 100 or operator error during a coupling procedure.

As shown in FIGS. 4 to 6, the housing 140 may be configured to have a hollow column shape as a whole (for example, the shaped of a hollow hexahedral column, as shown in the drawings). The housing 140 may be constructed to support the two or more first magnets 130 and the printed circuit board 170, and may accommodate the bobbin 110 such that the bobbin 110 is movable with respect to the housing 140 in the first direction.

The housing 140 may have four side flat surfaces. The side walls of the housing 140 may be sized to be equal to or larger than the first magnet 130.

Two pairs of opposite side walls 141 of the four side walls 141 of the housing 140 may be provided with magnet mounting holes or recesses in which the first magnets 130 are mounted or fitted. The magnet mounting holes or recesses may have a shape and size corresponding to the first magnet 130, and may have a shape capable of guiding the first magnets 130.

The magnet mounting holes may be respectively provided with a pair of main magnets 130*a* and a pair of sub magnets 130*b*, namely, a total of four first magnets 130. The magnet mounting holes may have a size and shape that correspond to the main magnet 130*a* and the sub magnet 130*b*, respectively.

Among the four side walls 141 of the housing 140, one of the side walls, at which the pair of sub magnets are positioned, may be provided with a sensor through hole to which a position sensor 180, which will be described later, is disposed, secured or coupled. The sensor through hole preferably has a size and shape corresponding to that of the position sensor 180.

The first magnet 130 may also be disposed in a manner other than the manner of being coupled to the housing 140. For example, the first magnet 130 may be securely disposed in the cover member 300, and may be securely disposed at any component as long as the first magnet 130 is disposed at a position corresponding to the coil 120 provided on the bobbin 110. In some cases, a holder for the first magnet 130 may be additionally provided in the lens moving apparatus.

Furthermore, the one side wall of the housing 400 may be provided with at least one mounting protrusion 149 so as to enable the printed circuit board 170 to be mounted, disposed or temporarily secured thereto. The mounting protrusion 149 is fitted in a mounting hole 173 formed in the printed circuit board 170. Although the mounting hole 173 and the mounting protrusion 149 are preferably coupled to each other in a loose fitting manner or in an interference fitting manner, they may provide only a relative guiding function.

As shown in FIGS. 4 and 5, the housing 140 may be provided at an upper surface thereof with a plurality of first stoppers 143 which project upward. The first stoppers 143 can also serve to guide the installation position of the upper elastic member 150. To this end, as shown in FIG. 7, the upper elastic member 150 may be provided at positions corresponding to the first stoppers 143 with guide recesses 155 having a shape corresponding to that of the first stoppers 143.

Furthermore, the housing 140 may be provided at an upper surface thereof with a plurality of upper frame support protrusions 144 to which the outer frame 152 of the upper elastic member 150 is coupled. As described hereinafter, the outer frame 152 of the upper elastic member 150 may be provided with first through holes 152*a* having a shape corresponding to that of the upper frame support protrusions 144. The upper frame support protrusions 144 may be bonded to the first through holes 152*a* by means of adhesive or fusion bonding. Fusion bonding may include thermal fusion boding, ultrasonic fusion bonding and the like.

As shown in FIG. 6, the housing 140 may be provided at a lower surface thereof with a plurality of lower frame support protrusions 147 to which the outer frame 162 of the lower elastic member 160 is coupled. The outer frame 162 of the lower elastic member 160 may be provided at positions corresponding to the lower frame support protrusions 147 with fitting recesses or holes 162*a* having a shape corresponding to that of the lower frame support protrusions 147. The lower frame support protrusions 147 may be bonded to the fitting recesses 162*a* by means of adhesive or fusion bonding. Fusion bonding may include thermal fusion boding, ultrasonic fusion bonding and the like.

Although the first magnets 130 may be secured to the magnet mounting holes by means of an adhesive, the first magnets 130 may also be secured by means of adhesive members, such as double-sided adhesive tape, without limitation. In a modification, the housing 140 may be provided at an inner surface thereof with magnet mounting recesses in place of the magnet mounting holes, and the magnet mounting recesses may have a size and shape corresponding to those of the first magnets 130.

The first magnets 130 may be installed at positions corresponding to the coil 120 provided around the bobbin 110. The first magnets 130 may be integrally formed. In this embodiment, the first magnets 130 may be positioned such that the inner surface of the first magnet 130 facing the coil 120 of the bobbin 110 serves as the N pole and the outer surface of the first magnet 130 serves as the S pole. However, this embodiment is not limited thereto, and the reverse configuration is also possible. Furthermore, each of the first magnets 130 may be divided into two magnet halves by a plane perpendicular to the first direction.

The first magnets 130 may be configured to have a cuboid shape having a predetermined width, and may be fitted in the magnet mounting holes or recesses 141 such that the wider surfaces of the first magnets 130 serve as parts of side walls of the housing 140. The first magnets 130, which face each other, may be positioned to be parallel to each other.

Furthermore, the first magnets 130 may be positioned to face the coil 120 of the bobbin 110. The magnet 130 and the coil 120 of the bobbin 110 may be positioned such that the surface of the first magnet 130 and the surface of the coil 120 are parallel to each other.

However, this embodiment is not limited thereto, and only one of the surfaces of the first magnet 130 and the coil 120 of the bobbin 110 may be flat, and the other surface may be curved according to some design. Alternatively, the surfaces of the first magnet 130 and the coil 120 of the bobbin 110 that face each other may be curved. In this case, the surfaces of the first magnet 130 and the coil 120 of the bobbin 110 that face each other may have the same radius of curvature.

As described above, the one side wall of the housing 140 may be provided with the sensor mounting hole or recess, and the position sensor 180 may be fitted or disposed in the sensor mounting hole. The position sensor 180 is conductively coupled to the surface of the printed circuit board 170 by means of soldering. In other words, the printed circuit board 170 may be secured, supported or disposed to the outer surface of the one side wall 141 of the housing 140 in which the sensor mounting hole or recess is formed.

The position sensor 180, in conjunction with the second magnet 190 of the bobbin 110, may constitute the displacement detection unit for determining the first displacement value of the bobbin 110 in the first direction. To this end, the position sensor 180 and the sensor mounting hole or recess may be disposed at positions corresponding to the second magnet 190 so as to be spaced apart from the second magnet 190 by a predetermined distance.

The position sensor 180 may be a sensor for detecting variation in magnetic force generated from the second magnet 190 of the bobbin 110. Furthermore, the position sensor 180 may be a Hall sensor. However, this embodiment is merely illustrative, and is not limited to the Hall sensor. Any sensor capable of detecting variation of magnetic force may be used as the position sensor 180, and any sensor capable of detecting position in addition to variation of magnetic force may also be used. For example, a photo reflector may be used as the sensor.

The printed circuit board 170 may be coupled or disposed to one side surface of the housing 140, and may have the mounting hole or recess 173 as described above. Consequently, the installation position of the printed circuit board 170 may be guided by means of the mounting protrusion 149 provided at one side surface of the housing 140.

The printed circuit board 170 may include a plurality of terminals 171 through which external power is supplied. Accordingly, the printed circuit board 170 may supply power to the coil 120 of the bobbin 110 and the position sensor 180. The number of terminals 171 formed on the printed circuit board 170 may be increased or decreased in accordance with the types of components which are required to be controlled. According to this embodiment, the printed circuit board 170 may be embodied as an FPCB.

The printed circuit board 170 may include a controller for controlling the amount of current applied to the coil 120 based on the first displacement value detected by the displacement detection unit. In other words, the controller is mounted on the printed circuit board 170. In other embodiments, the controller may not be mounted on the printed circuit board 170, but may be mounted on another additional substrate, which may be the substrate on which the image sensor of the camera module is mounted or another additional substrate.

The calibration of the driving distance of the actuator may be additionally performed based on the difference in Hall voltage caused by variation of magnetic flux (i.e. density of magnetic flux detected by the hall sensor).

The bobbin 110 may be constructed to reciprocate in the first direction with respect to the housing 140, which is stationary in the first direction. The autofocusing function may be implemented by movement of the bobbin 110 in the first direction.

The upper elastic member 150 and the lower elastic member 160 may flexibly support upward and/or downward movement of the bobbin 110 in the first direction. The upper elastic member 150 and the lower elastic member 160 may be embodied as leaf springs.

As shown in FIGS. 7 and 8, the upper elastic member 150 and the lower elastic member 160 may include inner frames 151 and 161 coupled to the bobbin 110, outer frames 152 and 162 coupled to the housing 140, and connectors 153 and 163 connecting the inner frames 151 and 161 and the outer frames 152 and 162, respectively.

The connectors 153 and 163 may be bent at least one time to form a predetermined pattern. The upward and/or downward movement of the bobbin 110 in the direction of the optical axis may be flexibly (or elastically) supported by fine deformation and positional variation of the connectors 153 and 163.

According to this embodiment, as shown in FIG. 7, the upper elastic member 150 may include a plurality of first through holes **152*a* formed in the outer frame 152 and a plurality of second through holes 151*a* formed in the inner frame 151**.

The first through holes **152*a* may be fitted over the upper frame support protrusions 144 provided on the upper surface of the housing 140, and the second through holes 151*a* may be fitted over upper support protrusions provided on the upper surface of the bobbin 110, which will be described later. Specifically, the outer frame 152 may be secured or coupled to the housing 140 through the first through holes 152*a*, and the inner frame 151 may be secured or coupled to the bobbin 110 through the second through holes 151*a***.

The connectors 153 may connect the inner frame 151 to the outer frame 152 such that the inner frame 151 is elastically deformable in the first direction with respect to the outer frame 152. More specifically, the connectors 153 may elastically connect the inner frame 151, which is secured or coupled to the upper surface of the bobbin 110, to the outer frame 152, which is secured or coupled to the upper surface of the housing 140. As a result, the bobbin 110 and the housing 140, which are separated from each other, may be elastically connected to each other by means of the upper elastic member 150.

At least one of the inner frame 151 and the outer frame 152 of the upper elastic member 150 may be provided with at least one terminal member which is conductively connected to at least one of the coil 120 of the bobbin 110 and the printed circuit board 170.

As shown in FIG. 8, the lower elastic member 160 may include a plurality of fitting recesses or holes **162*a* formed in the outer frame 162 and a plurality of third through holes or recesses 161*a* formed in the inner frame 161**.

The fitting recesses or holes **162*a* may be fitted over the lower frame support protrusions 147 provided on the lower surface of the housing 140, and the third holes or recesses 161*a* may be fitted over lower support protrusions provided at the lower surface of the bobbin 110, which will be described later. Specifically, the outer frame 162 may be secured or coupled to the housing 140 through the fitting recesses or holes 162*a*, and the inner frame 161 may be secured or coupled to the bobbin 110 through the third through holes or recesses 161*a***.

The connectors 163 may connect the inner frame 161 to the outer frame 162 such that the inner frame 161 is elastically deformable in the first direction with respect to the outer frame 162 by a predetermined distance. Specifically, the connectors 163 may elastically connect the inner frame 161, which is secured or coupled to the lower surface of the bobbin 110, to the outer frame 162, which is secured or coupled to the lower surface of the housing 140. As a result, the bobbin 110 and the housing 140, which are separated from each other, may be elastically connected at lower ends thereof to each other by means of the lower elastic member 160.

As shown in FIG. 8, the lower elastic member 160 may include a first lower elastic member **160*a* and a second lower elastic member 160*b*, which are separated from each other. Thanks to the structure comprising two halves, the lower elastic member 160 may receive power having different polarities or different powers through the first lower elastic member 160***a* and the second elastic member 160*b*.

More specifically, after the inner frame 161 and the outer frame 162 are coupled to the bobbin 110 and the housing 140, respectively, solder portions are provided at the positions on the inner frame 161 corresponding to the two ends of the coil 120 provided at the bobbin 110. Conductive connection, such as soldering, is performed at the solder portions so as to enable the powers having different polarities or the powers different from each other to be applied thereto.

In addition, since the first lower elastic member 160*a* is conductively connected to one of the two ends of the coil 120 and the second lower elastic member 160*b* is conductively connected to the other of the two ends of the coil 120, external current and/or voltage may be applied thereto.

The upper elastic member 150, the lower elastic member 160, the bobbin 110 and the housing 140 may be assembled through a bonding process using thermal fusion and/or adhesive. The assembly process may be implemented by securing the components to one another by thermal fusion and then bonding the components to one another using adhesive.

In a modification, the upper elastic member 150 may be composed of the two halves, and the lower elastic member 160 may be integrally constructed.

At least one of the inner frame 161 and the outer frame 162 of the lower elastic member 160 may be provided with at least one terminal member, which is conductively connected to at least one of the coil 120 of the bobbin 110 and the printed circuit board 170.

Figure 9:
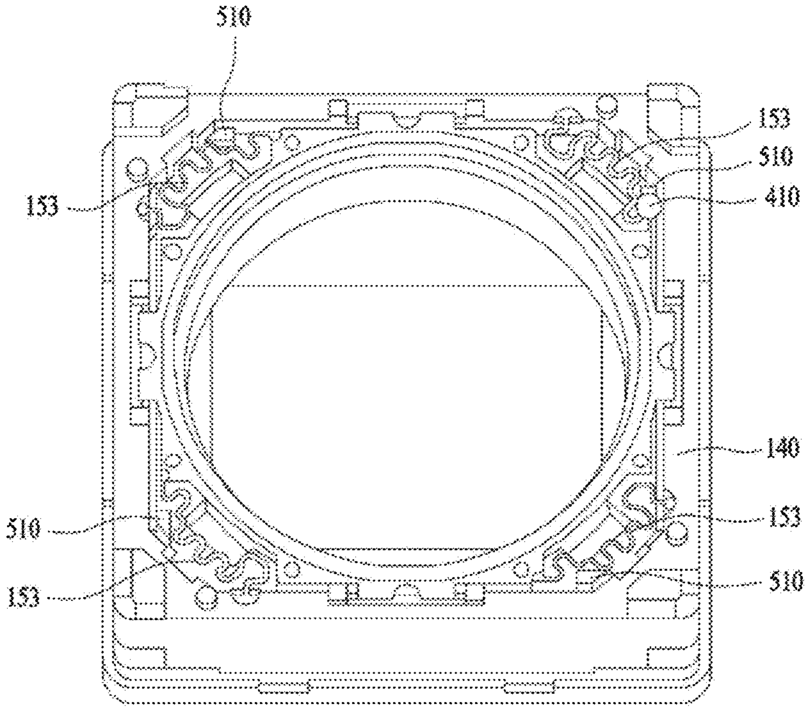
FIG. 9 is a view illustrating a boss and a damping member, according to the embodiment of the present invention.
Figure 10:
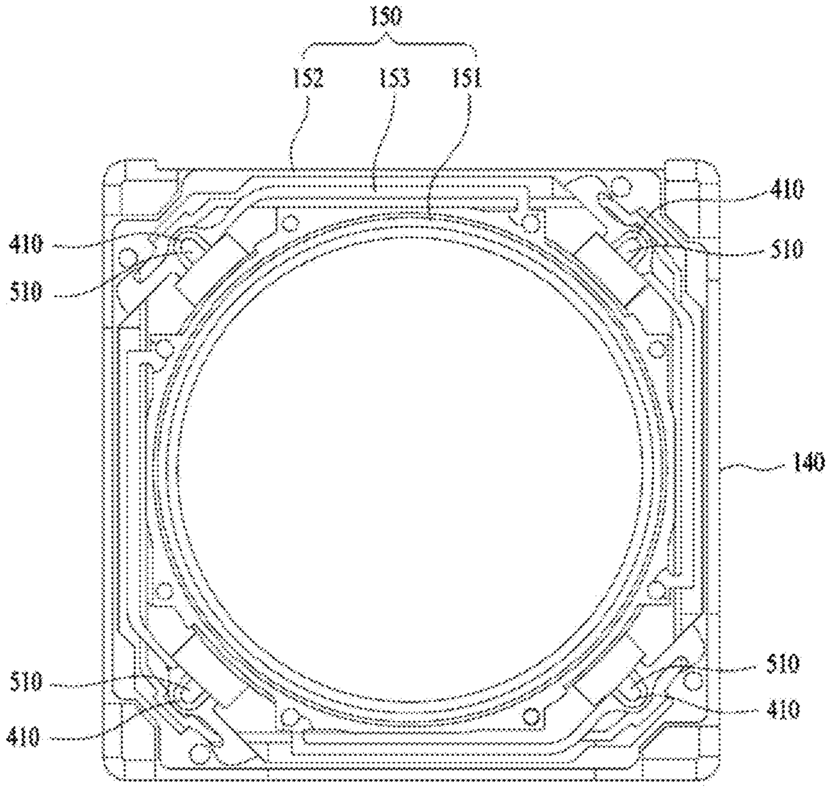
FIG. 10 is a view illustrating a boss and a damping member, according to another embodiment of the present invention.

FIG. 9 is a view illustrating a boss 510 and a damping member 410, according to the embodiment of the present invention. FIG. 10 is a view illustrating a boss 510 and a damping member 410, according to another embodiment of the present invention.

The damping member 410 may serve as an attenuator for absorbing vibration in the first direction generated during lens driving or autofocusing of the lens moving apparatus 100. The damping member 410 may be provided between a stationary body and a movable body which is moved in the first direction during autofocusing of the lens moving apparatus 100.

As shown in FIG. 9, by way of example, the damping member 410 may be disposed between the upper elastic member 150, disposed on the bobbin 110 and the housing 140, and the bobbin 110. The damping member 410 is attached at a portion thereof to the upper elastic member 150 and is attached at another portion thereof to the bobbin 110 so as to couple the upper elastic member 150 to the bobbin 110.

The damping member 410 may be disposed between the bobbin 110 and the upper elastic member 150 such that the bobbin 110 is movable in the first direction with respect to the housing 140 within a predetermined range.

To this end, the damping member 410 may be made of photo-curable resin. The damping member 410 is preferably made of ultraviolet-curable resin, and more preferably made of an ultraviolet-curable silicone, a damping silicone or a damping member.

In order for the bobbin 110 to be movable in the direction of the optical axis within a predetermined range in the state of not being fixedly coupled to the upper elastic member 150, the damping member 410 may be present in a semi-cured gel state. The semi-curing procedure of the damping member 410 may be performed in such a way as to expose the damping member 410, which is applied to the upper elastic member 150 and the bobbin 110, to light (or ultraviolet) or heat for a predetermined period of time.

Specifically, in an example of the damping member 410, the boss 510 is formed on the upper surface of the bobbin 110, and the upper elastic member 150 partially surrounds at least a portion of the boss 510. The damping member 410 may be coupled to the upper elastic member 150 and the boss 510 at the area at which the upper elastic member 150 surrounds at least a portion of the boss 510.

As shown in FIGS. 9 and 10, more specifically, in an example of the damping member 410, the upper elastic member 150 may be coupled to the connectors, which connect the inner frame 151 to the outer frame 152, and the boss 510.

At this point, since the damping member 410 is formed in such a manner as to connect the boss 510 to the connectors 153 of the upper elastic member 150, the damping member 410 may be applied between the boss 510 and the connectors 153 and/or the upper surface of the boss 510, and may be cured by light or heat.

Accordingly, when the damping member 410 is applied in a liquid state, the moving distance of the liquid damping member 410 is remarkably reduced due to the surface tension of the liquid damping member 410 acting on the boss 510 and the connectors 153, compared to the application through clearance, thus making it possible to remarkably reduce contamination and malfunction of the lens moving apparatus 100 due to excessive movement of the liquid damping member 410.

When the height of the boss 510 is increased to be higher than the upper surface of the upper elastic member 150, the contact surface between the boss 510 and the liquid damping member 410 is increased, thus increasing the surface tension exerted on the boss 510 by the liquid damping member 410. Consequently, it is also possible to further reduce the distance that the liquid damping member 410 moves thanks to the increased surface tension.

As shown in FIGS. 9 and 10, the damping member 410 may include a plurality of damping members, which are disposed near the respective corners of the housing 140. Accordingly, the damping member 410 may include the same number of damping members as the boss 510 or the connecters 153. However, FIG. 9 shows only one damping member 410 for the convenience of explanation.

FIG. 10 is a view showing the boss 510 and the damping member 410 according to another embodiment, which is different from that shown in FIG. 9.

In the embodiment shown in FIG. 9, a plurality of bosses 510 are provided at suitable positions in consideration of the shape of the upper elastic member 150, which has a plurality of bent portions.

However, in the embodiment shown in FIG. 10, the bosses 510 are formed on the bobbin 110 such that the bosses 510 are positioned along a diagonal line that connects the corners of the housing 140, and the shape of the upper elastic member 150 is correspondingly changed.

Specifically, as shown in FIG. 10, the bent portions of the connectors 153 may be provided only at points adjacent to the bosses 510 such that the upper elastic member 150 is easily mounted on the bobbin 110, including the bosses 510, and the housing 140.

Although several examples of the coupling relationship between the bosses 510 formed on the bobbin 110, the upper elastic member 150 and the damping members 410 have been described heretofore, the present invention is not limited thereto, and the damping members 410 may be configured in various manners.

For example, the damping members 410 may be disposed at surface regions other than, but adjacent to, the corner regions of the housing 140, and may also be disposed both at the corner regions and the surface regions of the housing 140. Furthermore, the damping members 410 may, for example, be provided at the inner frame 151 or the outer frame 152 rather than the connectors 153 of the upper elastic member 150 in a coupling manner.

According to the embodiment, the damping members 410 may be disposed in such a manner as to not be coupled to the stationary parts of the lens moving apparatus 100, such as the cover member 300 and the housing 140, but so as to be coupled to the movable parts, such as the upper and/or lower elastic members 160 and the bobbin 110. Accordingly, since the moving distance of the damping members 410 is reduced to about half or less, compared to the case of being coupled to the stationary parts, there are effects of remarkably reducing breakage and decrease in damping performance caused by the excessive movement of the damping members 410.

Meanwhile, the damping members 410 may also be disposed in such a manner as to connect the lower elastic member 160 to the bobbin 110, like the upper elastic member 150. In this case, the damping members 410 coupled to the lower elastic member 160 and the bobbin 110 may be coupled in a manner that is identical or similar to that by which the damping members 410 are coupled to the upper elastic member 150 and the bobbin 110. At this point, in order to couple the damping members 410 to the lower elastic member 160 and the bobbin 110, the bobbin 110 may be provided at a lower portion thereof with additional bosses 510.

Furthermore, the damping members 410 may be provided in such a manner as to be coupled to all of the upper elastic member 150, the lower elastic member 160 and the bobbin 110. Hereinafter, the damping members 410 are described as being disposed so as to couple to the upper elastic member 150 to the bobbin 110 for the brevity of explanation.

According to the embodiment, the damping members 410 are disposed in such a manner as to not be coupled to the stationary parts that are incapable of moving in the lens moving apparatus 100, such as the cover member 300 and the housing 140, but to be coupled to the movable parts, such as the upper and/or lower elastic members 160 and the bobbin 110. Accordingly, since the moving distance of the damping members 410 is reduced to about half or less compared to the case of being coupled to the stationary parts, there are effects of remarkably reducing breakage and decrease in damping performance caused by the excessive movement of the damping members 410.

FIGS. 11A to 11D are views illustrating the coupling relationship between the bosses 510, the damping members 410 and the connectors 153 according to various embodiments of the present invention. In the respective embodiments, only the case where the damping members 410 are disposed over the bobbin 110 and the housing 140 is described for the brief explanation. Of course, another case, in which the damping members 410 are disposed under the bobbin 110 and the housing 140, may also have a structure identical or similar to the embodiment that will be described below.

The connector 153 may be provided with a receptor 520 for accommodating the boss 510 and the damping member 410. The shapes of the receptor 520 and the coupling structures of the boss 510, the damping member 410 and the connector, associated with the receptor 520, will now be described with reference to FIGS. 11A and 11B.

Figure 11A:
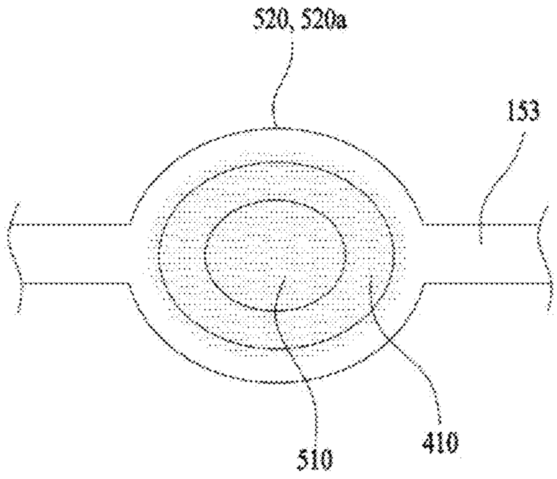
FIGS. 11A to 11D are views illustrating the coupling relationship between the bosses, the damping members and the connectors according to various embodiments of the present invention.

As shown in FIG. 11A, an example of the receptor 520 is constituted by a closed loop portion 520*a* receiving the boss. The damping member 410 may be at least partially disposed between the boss 510 and the receptor 520, and may be coupled to the connector 153 and the boss 510.

For example, the damping member 410 is applied so as to cover a portion of the upper surface of the connector 153 constituting the closed loop portion 520*a* and the entire upper surface of the boss 510, whereby the volume of the damping member 410 is increased and the damping effect is thus improved.

Figure 11B:
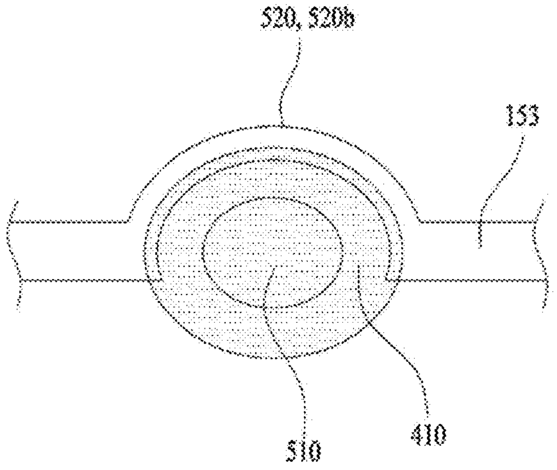

As shown in FIG. 11B, another example of the receptor 520 is constituted by an open loop portion 520*b* receiving the boss 510. The damping member 410 may be at least partially disposed between the boss 510 and the receptor 520, and may be coupled to the connector 153 and the boss 510.

As in the preceding example, the damping member 410 is also applied so as to cover a portion of the upper surface of the connector 153 constituting the open loop portion 520*b* and the entire upper surface of the boss 510, whereby the volume of the damping member 410 is increased and the damping effect is thus improved.

Figure 11C:
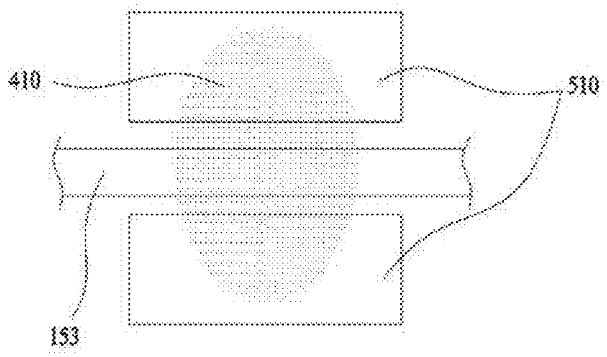
Figure 11D:
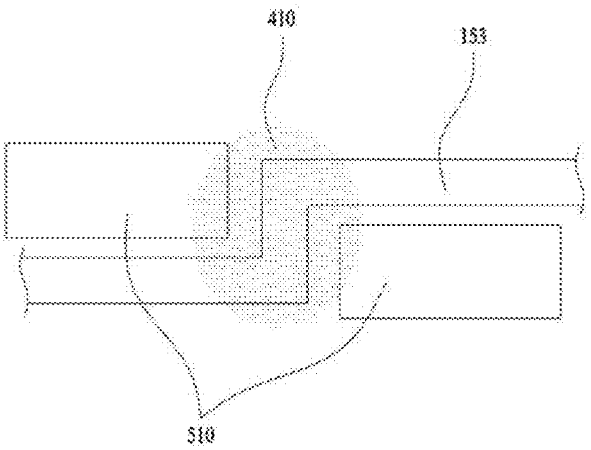

As shown in FIGS. 11C and 11D, which show other examples of the structure of the damping member 410, the boss 510 may be composed of a pair of boss parts, which are spaced apart from each other by a predetermined distance, and the connector 153 may be disposed between the pair of boss parts 510. The damping member 410 may be at least partially disposed between the boss parts 510 and the receptor 520, and may be coupled to the connector 153 and the boss parts 510.

Specifically, as shown in FIG. 11C, the pair of boss parts 510 may face each other with a predetermined distance therebetween, and the connector 153 may be disposed between the pair of boss parts 510. The damping member 410 may be coupled to the pair of boss parts 510 and the connector 153.

As shown in FIG. 11D, a pair of boss parts 510 are spaced apart from each other such that the center line of one of the pair of boss parts 510 deviates from the center line of the other of the pair of boss parts. The connector 153 is configured to have a bent portion, which is disposed in the space defined between the pair of boss parts 510, and the damping member 410 is coupled to the pair of boss parts 510 and the connector 153.

The damping member 410 is applied so as to cover at least a portion of the connector 153 and the boss parts 510, whereby the volume of the damping member 410 is increased and the damping effect is thus improved.

Figure 12:
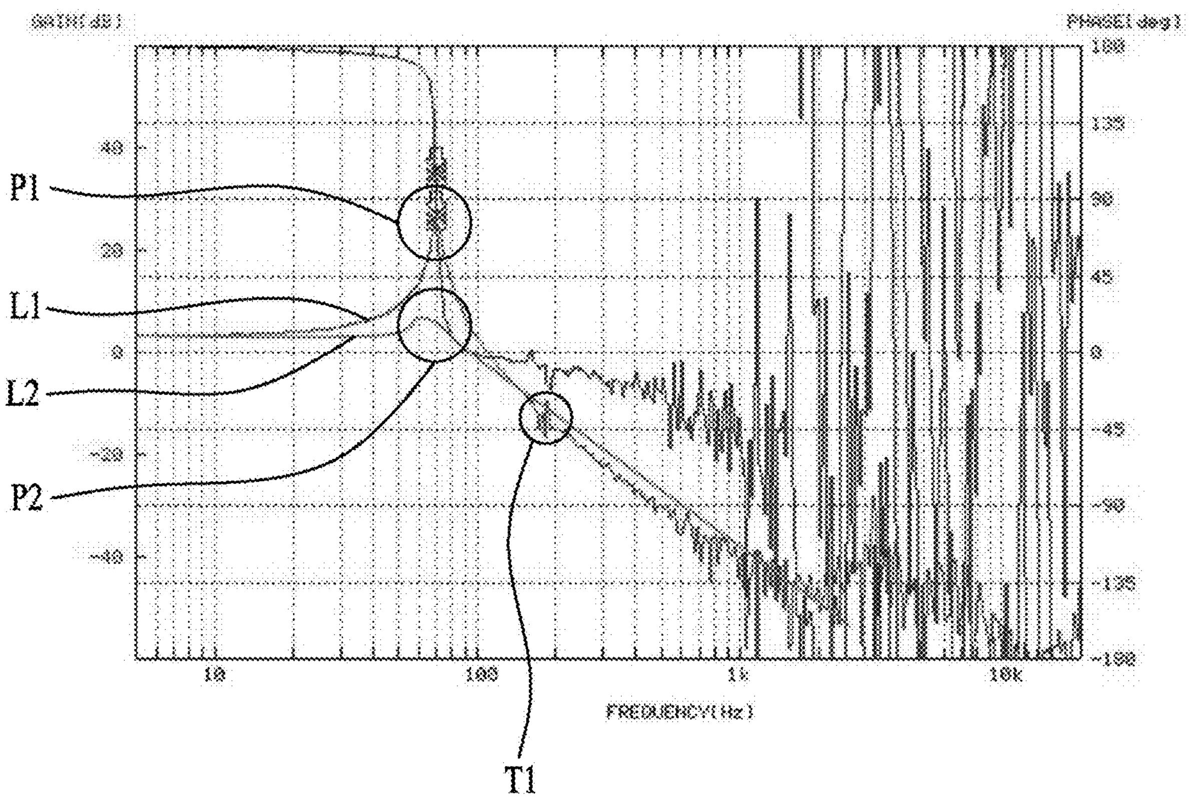
FIG. 12 is a graph illustrating the comparison between the case with the damping member and the case without the damping member in terms of vibrations in the first direction of the lens moving apparatus.

FIG. 12 is a graph illustrating the comparison between the case with the damping member and the case without the damping member in terms of vibrations in the first direction of the lens moving apparatus. In FIG. 12, L1 represents the vibration characteristics of the lens moving apparatus 100 without the damping member 410, and L2 represents the vibration characteristics of the lens moving apparatus 100 with the damping member 410.

In the case where the lens moving apparatus 100 is not provided with the damping member 410 for autofocusing operation, curve L1 exhibits resonance points (or resonance range) P1 and T1, at which the amplitude of vibration is maximized. P1 is the resonance point caused by movement in the first direction of the lens moving apparatus 100, and T1 is the resonance point caused by tilting, rotation or shifting in the second and/or third directions, which are perpendicular to the first direction, of the lens moving apparatus 100.

Meanwhile, in the case where the lens moving apparatus 100 is provided with the damping member 410 for autofocusing operation as in this embodiment, curve L2 exhibits only one resonance point P2, which is remarkably lowered compared to the resonance point P1, and does not exhibit the resonance point T1, because the resonance point T1 is eliminated.

According to this embodiment, since the damping members 410 are disposed between at least one of the upper and lower elastic members 150 and 160 and the bobbin 110, resonance caused by driving in the first direction and resonance caused by tilting or shifting in the second and/or third directions during autofocusing operation are eliminated, or the peak values of the resonances are greatly lowered, thus remarkably reducing breakage and malfunction of the upper elastic member 150 and the lower elastic member 160.

Figure 13:
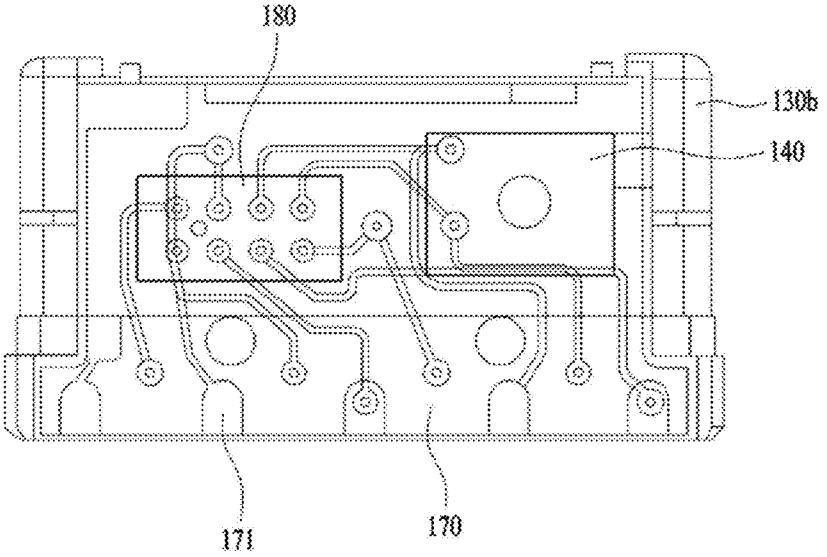
FIG. 13 is a schematic front view showing the portion of the lens moving apparatus according to one embodiment, to which the position sensor is attached.
Figure 14:
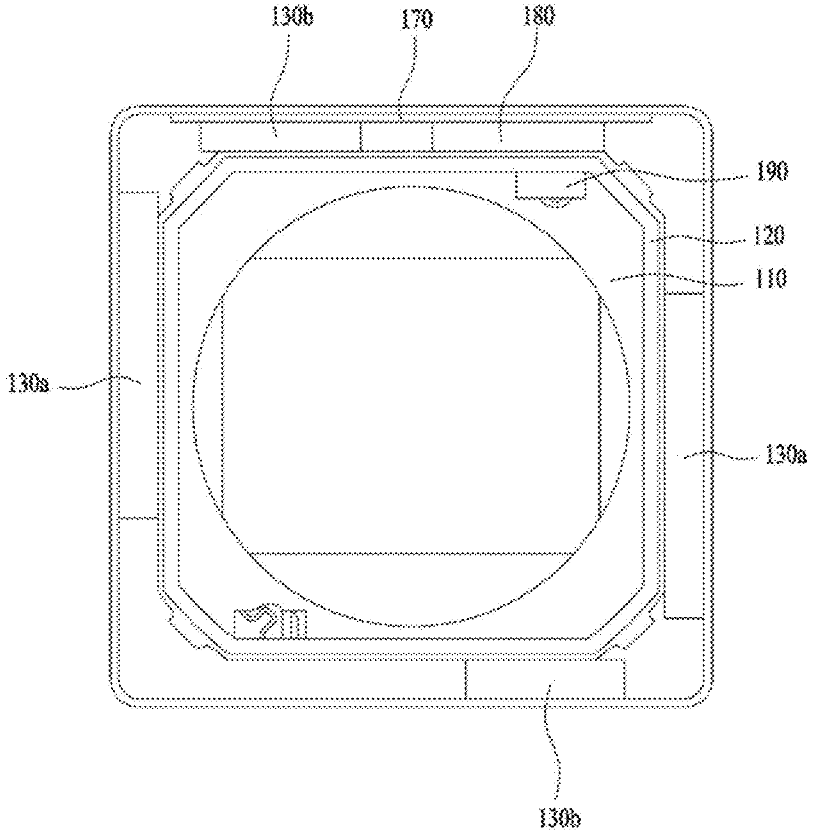
FIG. 14 is a schematic cross-sectional view showing the lens moving apparatus according to one embodiment when viewed in the first direction.

FIG. 13 is a schematic front view showing the portion of the lens moving apparatus according to one embodiment, to which the position sensor 180 is attached. FIG. 14 is a schematic cross-sectional view showing the lens moving apparatus 100 according to one embodiment when viewed in the first direction.

In this embodiment, the first magnet 130 may include a pair of main magnets 130*a*, which are respectively provided at two opposed side walls of the housing 140, and a pair of sub magnets 130*b*, which are respectively provided at the other two opposite side walls of the housing 140. According to another embodiment, each of the main magnets 130*a* and the sub magnets 130*b* may be divided into a plurality of magnet parts in the first direction and/or the surface direction of the housing 140.

In the embodiment, the surface area of the main magnet 130*a* may be larger than that of the sub magnet 130*b*. This is because the sub magnet 130*b* must be smaller than the main magnet 130*a* due to the spatial restriction whereby at least one of the sub magnets 130*b* and the position sensor 180 have to be disposed at the same side wall of the housing 140 and because the main magnet 130*a* must have a larger surface area than the sub magnet 130*b* in order to generate sufficient magnetic force to drive the bobbin 110.

In this embodiment, the lens moving apparatus may include the displacement detection unit for detecting the displacement value by which the bobbin 110 moves in the first direction. The displacement detection unit may include the second magnet 190 coupled to the bobbin 110 and the position sensor 180, which is provided at one side wall of the housing 140 such that the position sensor 180 is disposed at a position corresponding to the second magnet 190 with a predetermined distance between the position sensor 180 and the second magnet 190.

As shown in FIGS. 13 and 14, the position sensor 180 is disposed near the corner of the housing 140, and the sub magnet 130*b*, which is disposed at a side wall at which the position sensor 180 is disposed, is disposed near the corner opposite the corner near which the position sensor 180 is disposed, whereby the sub magnet 130*b* is spaced apart from the position sensor 180 by a predetermined distance.

Furthermore, the main magnet 130*a*, which is disposed at one side wall of the housing 140 sharing the corner which is positioned near the position sensor 180, is disposed near the corner opposite to the corner near which the position sensor 180 is disposed, whereby the main magnet 130*a* is spaced apart from the position sensor 180 by a predetermined distance.

The pair of main magnets 130*a* may be disposed to be symmetrical about the center point of the housing 140, and the pair of sub magnets 130*b* may also be disposed to be symmetrical about the center point of the housing 140.

Thanks to the structure, the first magnet 130 including the main magnets 130*a* and the sub magnets 130*b* is disposed in the housing 140 so as to be spaced apart from the position sensor 180 and the second magnet 190 by a predetermined distance.

Therefore, the magnetic field generated by the second magnet 190 is able to maintain its inherent characteristic value without interference with the magnetic field generated by the first magnet 130. Consequently, the position sensor including the position sensor 180 and the second magnet 190 can more accurately detect the displacement value in the first direction of the bobbin 110.

In addition, since the main magnets 130*a* and the sub magnets 130*b*, which are positioned near the position sensor 180 and the second magnet 190, are spatially spaced apart from the position sensor 180 and the second magnet 190, they are concentrated toward the respective corners of the housing 140. Accordingly, in order to overcome the imbalance of magnetic field of the first magnet 130 due to the concentrated disposition, the main magnets 130*a* and the sub magnets 130*b* may be arranged to be symmetrical about the center point of the housing 140, as shown in FIG. 14.

The lens moving apparatus according to the above embodiments may be applied to products in various fields, for example, camera modules. Such a camera module may be applied, for example, to mobile devices such as cellular phones.

The camera module according to the embodiment may include a lens barrel coupled to the bobbin 110, an image sensor (not shown), a PCB (not shown) and an optical system.

The lens barrel is as described above, and the PCB is the component on which the image sensor is mounted, and may constitute the bottom surface of the camera module.

The optical system may include at least one lens for transmitting an image to the image sensor. The optical system may be provided with an actuator module capable of fulfilling functions of autofocusing and handshake correction. The actuator module functioning to fulfill the function of autofocusing may be variously constructed, and a voice coil unit motor is primarily used in the actuator module. The lens moving apparatus according to the embodiments may serve as an actuator module fulfilling both functions of autofocusing and handshake correction.

The camera module may further include an infrared ray screening filter (not shown). The infrared ray screening filter functions to block the incidence of light in the infrared range on the image sensor. In the base 210, illustrated in FIG. 1, the infrared ray screening filter may be installed at a position corresponding to the image sensor, and may be coupled to a holder member (not shown). The base 210 may support the lower portion of the holder member.

The base 210 may be provided with an additional terminal member for conductive connection to the PCB, and the terminal may be integrally formed using a surface electrode. The base 210 may serve as a sensor holder for protecting the image sensor. In this case, although a projecting portion may be formed downward along the lateral side surface of the base 210, it is not an essential component. Although not shown in the drawings, an additional sensor holder may be disposed under the base 210 to serve as the projecting portion.

Although embodiments have been described with reference to a number of illustrative examples thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus comprising:

a housing comprising first and second side walls opposite to each other and third and fourth side walls opposite to each other;

a bobbin disposed in the housing;

a first magnet comprising a first main magnet disposed on the first side wall, a second main magnet disposed on the second side wall, a first sub magnet disposed on the third side wall, a second sub magnet disposed on the fourth side wall;

a coil disposed on the bobbin and configured to move the bobbin in an optical axis direction by an interaction with the first magnet; and a position sensor configured to detect a displacement of the bobbin;

wherein the position sensor is disposed on the third side wall of the housing and spaced apart from the first sub magnet, and wherein the first sub magnet is not overlapped with the second sub magnet in a direction parallel to one of the opposite side walls of the housing, when viewed from a top.

2. The lens moving apparatus according to claim 1, wherein a length of each of the first and second main magnets in a direction parallel to the first side wall is larger than a length of each of the first and second sub magnets in a direction parallel to the third side wall.

3. The lens moving apparatus according to claim 1, comprising a circuit board disposed at the third side wall of the housing and electrically connected to the position sensor.

4. The lens moving apparatus according to claim 1, wherein the position sensor is positioned closer to a first corner of the housing than to a second corner of the housing, and wherein the first corner is adjacent to one end of the third side wall of the housing and the second corner is adjacent to another end of the third side wall of the housing.

5. The lens moving apparatus according to claim 1, comprising a second magnet disposed on the bobbin, wherein the position sensor is configured to detect variation in magnetic force generated from the second magnet.

6. The lens moving apparatus according to claim 1, wherein the position sensor is overlapped with the second sub magnet in a direction parallel to the first side wall of the housing, when viewed from a top.

7. The lens moving apparatus according to claim 5, wherein the second magnet is overlapped with the second sub magnet in a direction parallel to the first side wall of the housing, when viewed from a top.

8. The lens moving apparatus according to claim 1, wherein the first main magnet is overlapped with the second main magnet in a direction parallel to the third side wall of the housing, when viewed from a top.

9. The lens moving apparatus according to claim 8, wherein the first sub magnet is not overlapped with the second sub magnet in a direction parallel to the first side wall of the housing, when viewed from a top.

10. The lens moving apparatus according to claim 1, comprising a lower elastic member coupled to a lower portion of the bobbin and a lower portion of the housing, wherein the lower elastic member comprises a first lower elastic member coupled to one end of the first coil and a second lower elastic member coupled to an other end of the first coil.

11. The lens moving apparatus according to claim 10, comprising a circuit board disposed at the third side wall of the housing and electrically connected to the position sensor, and wherein the lower elastic member is electrically connected to the circuit board.

12. The lens moving apparatus according to claim 1, wherein the first sub magnet is positioned closer to the second main magnet than to the first main magnet.

13. The lens moving apparatus according to claim 1, wherein the second sub magnet is positioned closer to the first main magnet than the second main magnet.

14. The lens moving apparatus according to claim 1, wherein the position sensor is positioned closer to the first main magnet than the second main magnet.

15. The lens moving apparatus according to claim 1, wherein the first and second main magnets are disposed to be symmetrical about a center of the housing when viewed from a top.

16. The lens moving apparatus according to claim 1, wherein the first and second sub magnets are disposed to be symmetrical about a center of the housing when viewed from a top.

17. The lens moving apparatus according to claim 1, wherein the first coil is wound on an outer surface of the bobbin.

18. A camera module comprising:

a lens;

the lens moving apparatus according to claim 1; and an image sensor.

19. A lens moving apparatus comprising:

a housing;

a bobbin disposed in the housing;

a first magnet comprising a pair of main magnets disposed on opposite side walls of the housing and a pair of sub magnets disposed on other opposite side walls of the housing;

a coil disposed on the bobbin and configured to move the bobbin in an optical axis direction by an interaction with the first magnet; and a second magnet disposed on the bobbin; and a position sensor disposed on one of the other opposite side walls of the housing so as to positioned closer to the first main magnet than to the second main magnet.

20. The lens moving apparatus according to claim 19, wherein the first sub magnet is not overlapped with the second sub magnet in a direction parallel to one of the opposite side walls of the housing, when viewed from a top.

* * * * *